United States Patent
Westerling et al.

(10) Patent No.: US 7,053,630 B2
(45) Date of Patent: May 30, 2006

(54) LEVEL GAUGING SYSTEM

(75) Inventors: Jan Westerling, Linköping (SE); Olov Edvardsson, Täby (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 8 days.

(21) Appl. No.: 10/613,214

(22) Filed: Jul. 7, 2003

(65) Prior Publication Data

US 2004/0080324 A1    Apr. 29, 2004

Related U.S. Application Data

(60) Provisional application No. 60/394,369, filed on Jul. 8, 2002.

(51) Int. Cl.
*G01R 27/04* (2006.01)
*G01S 13/08* (2006.01)

(52) U.S. Cl. .................. 324/644; 324/639; 342/124

(58) Field of Classification Search ............. 324/644, 324/637, 642, 643, 617; 342/124, 129
See application file for complete search history.

(56) References Cited

U.S. PATENT DOCUMENTS

| | | | |
|---|---|---|---|
| 4,661,817 A | 4/1987 | Bekkadal et al. ........... 342/124 |
| 4,665,403 A | 5/1987 | Edvardsson ................ 342/124 |
| 4,820,970 A * | 4/1989 | Swanson ................... 324/640 |
| 5,406,842 A * | 4/1995 | Locke ...................... 73/290 R |
| 5,651,286 A * | 7/1997 | Champion et al. ......... 73/290 V |
| 5,659,321 A * | 8/1997 | Burger et al. .............. 342/124 |
| 6,081,241 A * | 6/2000 | Josefsson et al. .......... 343/771 |
| 6,606,053 B1 * | 8/2003 | Fehrenbach et al. ........ 342/124 |
| 2002/0020216 A1 * | 2/2002 | Schultheiss ............... 73/290 V |
| 2002/0101373 A1 * | 8/2002 | Arndt et al. ............... 342/124 |
| 2003/0025630 A1 * | 2/2003 | Fehrenbach et al. ........ 342/124 |

OTHER PUBLICATIONS

S. Stuchly et al., Microwave Surface Level Monitor, IEEE Transactions on Industrial Electronics and Control Instrumentation, vol. IECI-18, No. 3, Aug. 1971.
M. Skolnik ed., Introduction to Radar Systems, McGraw-Hill Book Co., Inc. 1962, pp. 559-566.
M. Skolnik ed., Radar Handbook, 1970, pp. 7-52, 11-1, 11-2, 26-26, 26-27.
M. Skolnik ed., Radar Handbook, $2^{nd}$ Edition, 1990, pp. 9.16-9.18.
D. Barton, Radars vol. 6, Frequency Agility and Diversity, 1977, pp. 1-2, 111-3, IV-2, VI-I.

* cited by examiner

*Primary Examiner*—Anjan Deb
(74) *Attorney, Agent, or Firm*—Westman, Champlin & Kelly, P.A (57) ABSTRACT

A radar level gauge for measuring the level of a surface of a product stored in a tank by use of radar. The radar transmits microwaves towards the surface and receives microwaves reflected by the surface and is adapted to transmit and receive microwaves within two widely separated frequency bands. Widely separated frequency bands are chosen to utilize the differences in attenuation due to foam on the surface and the differences in beam-width or other disturbances. The ratio between the center frequencies of the two widely separated frequency bands can be quantified as at least greater than 1.5:1 or preferably greater than 2:1.

38 Claims, 5 Drawing Sheets

LEVEL GAUGING SYSTEM

This application claims benefit of provisional Application No. 60/394,369, filed Jul. 8, 2002.

TECHNICAL FIELD

The present invention relates to a level gauging system for measuring the level of a surface of a product stored in a tank by use of a radar, where said radar transmits microwaves towards said surface and receives microwaves reflected by said surface and wherein said radar is adapted to transmit and receive said microwaves on at least two different microwave frequency bands.

BACKGROUND OF THE INVENTION

There is known in the art to measure the level of the surface of a product stored in a tank by means of a radar level gauge. Such devices are disclosed in a number of documents. As an example of such a document, it will here be referred to patent document U.S. Pat. No. 4,665,403.

Radar level gauges for use, as an example within the processing industry, must be able to function under very different conditions. The product stored could be a lot of different products, such as petroleum refinery products, liquid gases and other chemical compounds. This implies that such parameters as temperature and pressure can be of very shifting values. Disturbing structures also exist inside the tank. Such are, for example, devices as agitators, foam, etc., whereby measuring is rendered more difficult and may go wrong.

Three technical problems are recognized from this: 1° various structures inside the tank give disturbing radar echoes, 2° it is desirable to have an antenna creating a narrow antenna beam (among other to suppress disturbing echoes), 3° various propagation influences (dirt on the antenna, foam on a liquid product surface etc.) may reduce the desired echo greatly but in worst case leave the disturbing echoes. These problems are partly known in radar history (see for instance Merill I Skolniks 3 books Radar Systems 1962, Radar Hbk 1970 and Radar Hbk 1990—all from McGraw Hill). Typically a low radar frequency (up to 3 GHz) is used for long range surveillance systems (100 km and more) while a high radar frequency (10 GHz and higher), where rain etc. may limit the measuring range, are used for high precision navigation, fire control etc. at rather small distances (a few km).

In connection with level gauging in tanks there may be quite a number of disturbing echoes. The disturbing echoes from the surroundings, either if the echoes come from structures in a tank, or in the field of air traffic control, from ground echoes interfering with an echo from an aircraft, will limit the ability to detect or measure the desired echo among the many undesired ones. One standard solution to decrease the influence of such undesired interference for a pulse radar, as an example, is to let the transmitter frequency jump around within a band of a few 100 MHz to over 1 GHz. The use of these small frequency jumps within a radar band is normally called "frequency agility" (see chapter 9.7 in Skolniks Radar Hbk from 1990 or D K Bartons book "Frequency agility and diversity" from Artech House 1977). Multiple frequencies are also used in CW radars both as a frequency modulated CW radar (FMCW using a range of frequencies) and multiple frequency CW radar (MFCW for instance described in Skolniks book Radar Systems from 1962). MFCW radar has also been described for liquid level gauging ("Microwave surface level monitor" by Stanley Stuchley in IEEE trans. on industrial electronics, August 1971 and in patent document NO 831198). A frequency agility pulsed radar for level gauging is suggested in published patent document US 2002/0020216.

For a radar level gauge used in a tank the situation is in many ways different from an outdoor radar and the following conditions should especially be mentioned.

A) The tank geometry and structure may give many disturbing echoes, so normally a narrow beam is desirable, but on the other hand the mounting possibilities in the tank (the size of the already existing mounting hole) generally limit the available space for the antenna, which preferably should be big to give a narrow microwave beam from the antenna.

B) Another important factor is that many liquids or tank conditions create a foam layer on the liquid or a layer of dirt on the antenna. Due to the special dielectric properties of water, wet dirt, especially, may give a disastrous limitation of the propagation already at a few tenths of a mm wet dirt or a foam layer with the corresponding water content.

C) The frequency bands used for level gauging are for the time being around 6 GHz (related to the ISM band at 5.8 GHz), around 10 GHz and around 25 GHz (related to the ISM-band at 24.5 GHz). Nearly all radar level gauges are operated in closed metallic tanks and at low power so the leakage of electromagnetic power can be kept within current rules in spite of the need for a rather big bandwidth as compared to for instance the width of the ISM-bands.

D) Typical for a radar level gauge is further that the surface not always moves. The surface echo may thus be mixed up with fixed echoes from tank structures and a possibly destructive interference at certain frequencies may persist for a long time. At a pulse radar, a way to decrease such effects is to use more than one frequency, which is a closely related reason to use frequency agility in standard radars. As comparison an FMCW radar sweeps over a range of frequencies thus avoiding said problem.

The installation conditions (such as foaming state etc.) are in many cases not well known, as the tank may be old or not possible to open due to high pressure or extreme temperature in the tank, poisonous content etc.

The very diversified needs have created a number of different radar level gauges on the market among them 3 groups of gauges using frequencies around 6, 10 and 25 GHz. In all three cases typically 10% microwave bandwidth is used both in case of an FMCW system and a pulsed system (in which case the bandwidth is determined by the pulse length). To illustrate the range of differences, the lobe-width for the same antenna diameter is around 4 times bigger at 6 GHz compared to 25 GHz, while the attenuation through the same layer of dirt or foam corresponds to 4 times longer measuring distance at 6 GHz as compared to 25 GHz, given the same sensitivity. With the same measure the possible range at 6 GHz is around two times the range at 10 GHz given the same layer of dirt and the same antenna size. A 25 GHz radar level gauge is in practical cases not usable in combination with dirt and foam. The actual conditions may in practical cases be hard to know in advance so a change of gauge to one using another frequency frequently occurs.

The problems mentioned may be compensated for by use of more than one radar level gauge, where each of them can measure at a different frequency band. Such a solution is of course not wanted as it makes the system expensive and many times not possible to install in a tank.

SUMMARY OF THE INVENTION

According to one aspect of the invention, there is provided a radar level gauge for measuring the level of a surface of a product stored in a tank by use of a radar, where said radar transmits microwaves towards said surface and receives microwaves reflected by said surface and wherein said radar is adapted to transmit and receive said microwaves within two widely separated frequency bands. Widely separated frequency bands are chosen to utilize the differences in attenuation due to foam on the surface and the differences in beam-width or other disturbances. The ratio between the center frequencies of the two widely separated frequency bands can be quantified as at least greater than 1.5:1 or preferably greater than 2:1.

In the limiting case, when the ratio between the center frequencies is 1.5:1, the two frequency bands can be very close to each other. This, in particular, holds for the case when high bandwidths are used, such as 20% bandwidth or more. If the bandwidths of the two frequency bands are high, it is also possible that the frequency bands could touch or overlap each other.

Still, according to the invention, said radar level gauge is coupled to a multiband antenna. Said antenna could be any antenna having broadband performance. Preferred antennas are those from the group consisting of: a wide band horn antenna, a helix antenna, a patch array multiband antenna or a parabola fitted with a multiband feeder of said types.

One advantage with the level gauge according to the invention is that it is possible to measure the surface level of a product by use of switching between different frequencies bands. Thus it will not be necessary to change the level gauge equipment operating on a certain frequency band to another level gauge equipment operating on another frequency band that is better suited for the conditions prevailing in the tank. It will also be possible to perform the level gauging by measurements on more than one frequency band for the same product in the tank. This may be performed by an automatic switching between the available frequency bands, where after the results of the measurements performed at different frequency bands may be compared and analysed for a determination of the most accurate value of the level of the surface of the product inside the tank.

One further advantage with a radar level gauge according to the invention aspect is that a signal received from the radar can be made more advanced and analyzed by means of a comparison of different spectra. Judgements of which echo from the surface of the product in the tank that is the most accurate and which echoes that may be disregarded, as disturbance echoes are made available by the present invention.

To solve the problems as described in the prior art, there is thus disclosed a radar level gauge for measuring the level of a surface of a product stored in a tank by use of a radar which is capable of changing its frequency band depending on a changing situation in the tank and consequently without exact knowledge of all details before the installation of the radar level gauge is done. The measurement could then be done within more than one microwave frequency band and with a permanent consecutive frequency jumping between the bands and possibility for measuring by preference on the frequency band giving the best results. A special logic for evaluation of the results and for making a good choice of frequency band is an important part of the system. Another important detail is that the frequency band separation must be sufficient to give a clear difference in function when degradations such as foaming, dirt on the antenna etc. occur.

The frequency bands chosen can, for example, have diverting functionality, such as one high-penetration frequency band and one narrow beam frequency band as described herein.

Figure 7:
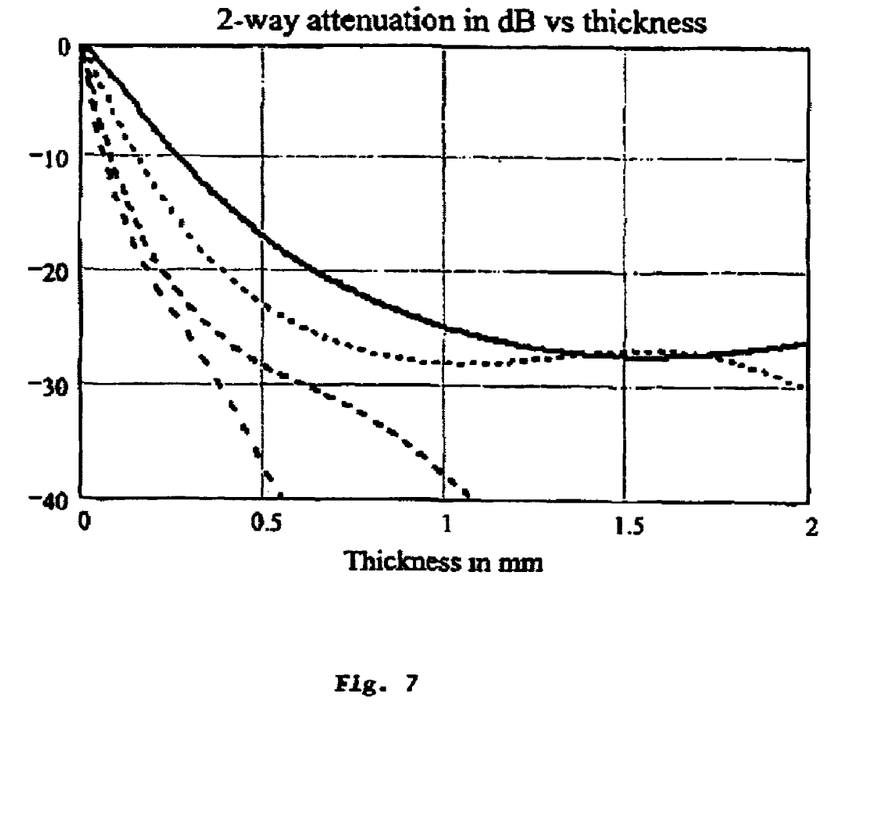
FIG. 7 shows a graph of attenuation versus thickness for various frequencies.

To illustrate the statements above the two-way attenuation is given below as a function of the thickness of a wet dirt layer on the antenna or the accumulated water content in a layer of foam. The four curves, illustrated in FIG. 7, are from top to bottom 6, 10, 25 and 77 GHz respectively. The influence on attenuation by foam and wet dirt as a function of frequency is highly non-linear where it can be seen from FIG. 7, that for instance a jump from 6 GHz to 10 GHz makes a similar attenuation difference as a jump from 10 GHz to 25 GHz.

Thus from system viewpoint it is very important to implement the two-band or multi-band operation over two (or more) sufficiently spread frequency bands such as 5.8 and 10 GHz, 5.8 and 25 GHz or 10 and 25 GHz in order to get optimal function over the full range of operation conditions. Typical standard circuits used in radar units are rather narrow band limited by their wave guide band (such as 4.9–7.05 GHz, 8.2–12.4 GHz or 22–33 GHz for three standard wave guides) or by typical components having 15–50% bandwidth). Mixer, directional coupler and wave guide transmission are three typical components in a radar level gauge system. One critical component is a circular wave guide having a single mode bandwidth of 1:1.31. In order to achieve the wide band required in the present invention, more complicated (and possibly more expensive but still well known and available) components have to be used. The semiconductor circuits in the transmitter and the receiver are in most cases based on microstripline components involving $\lambda/4$-pieces of lines limiting the ratio, bandwidth in GHz/center frequency in GHz, to 15–50%. Anyway, techniques being slightly more complicated are well known to extend the bandwidth ratio to the required 50–125%. Furthermore a suitable logic has to be used in the level gauge system to make a good evaluation or averaging of the measured data and it should be stressed that the requirements on this logic is very different in this frequency diversity case (two or more widely separated bands) as compared to the prior art frequency agility case (with a frequency choice over a fairly narrow, one and the same frequency band, still allowing standard components to be used).

One important part of the system of the present invention is a logic decision procedure. The signals received from the different frequency bands are compared and also stored over a certain time to make a good estimation of the information. When for instance two frequency bands are used, the higher frequency band typically will be more affected (decreased in amplitude) by foam on the surface and dirt on the antenna, while the echo in the lower frequency band might be less clean (more background noise) as the wider antenna lobe is more likely to pick up echoes from disturbing objects. For both (or more) frequency bands used in the present invention an echo spectrum is created and a number of suspected echoes are created as memory cells where echo amplitude, echo amplitude variation, calculated distance and an estimated surface velocity are stored. The echo amplitude variation is a typical characteristic for a turbulent surface and so is a possible surface level velocity (equal to a persisting change of the distance to the surface). Depending on the conditions in the tank these parameters are different and the logic process in the unit will come to different conclusions. The echo spectrum is converted to a number of logic variables from which it is deduced which of the frequency bands that are likely to give the best measured level value or if a weighted average of two or more frequency bands will give the most reliable level value. Within each frequency band the same function can be performed but much more important is the possibility created by the present invention to avoid signals with very low amplitude if a high frequency radar level gauge should be used under foamy conditions or to avoid disturbances from tank structures when non foamy liquids with low reflectivity are measured.

PREFERRED EMBODIMENTS OF THE INVENTION

A number of embodiments of the present invention supported by the enclosed figures will be disclosed in the following.

Figure 1:
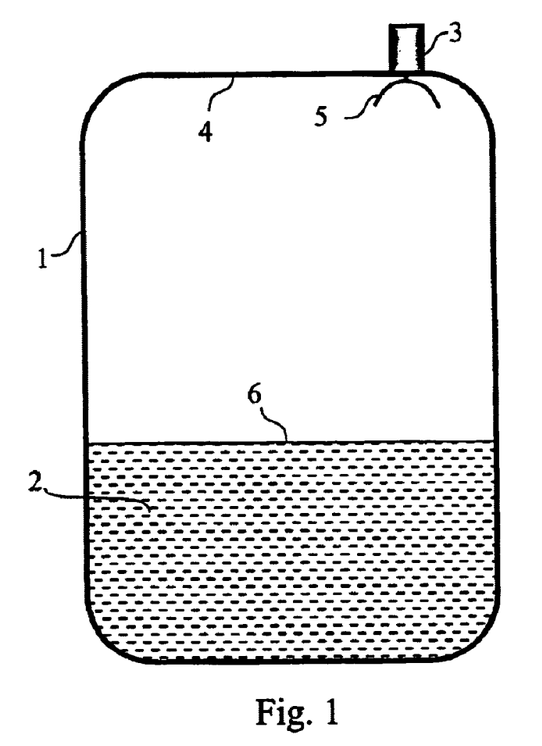
FIG. 1 shows a schematic view of a tank in which a product is stored and where a radar level gauge is arranged at the roof of the tank for measuring the level of the surface stored in the tank.

An application of a radar level gauge is shown in FIG. 1. A tank 1 is used for storing a product 2. The product may be such as oil, refined products, chemicals and liquid gas, or may be a material in powder form. A radar 3 is attached to the roof 4 of the tank 1. A microwave beam is transmitted from the radar via an antenna 5 at the interior of the tank. The transmitted beam is reflected from the surface 6 of the product and is received by the antenna 5. By means of a comparison and evaluating of the time lap between transmitted and reflected beam in a measuring and controlling unit, a determination of the level of the product surface 6 in a known manner is performed. The microwave may be transmitted from the antenna as a free radiated beam or via a wave guide (not shown), which communicates with the product. The radar level gauge as shown in FIG. 1 is only used as an example.

Figure 2:
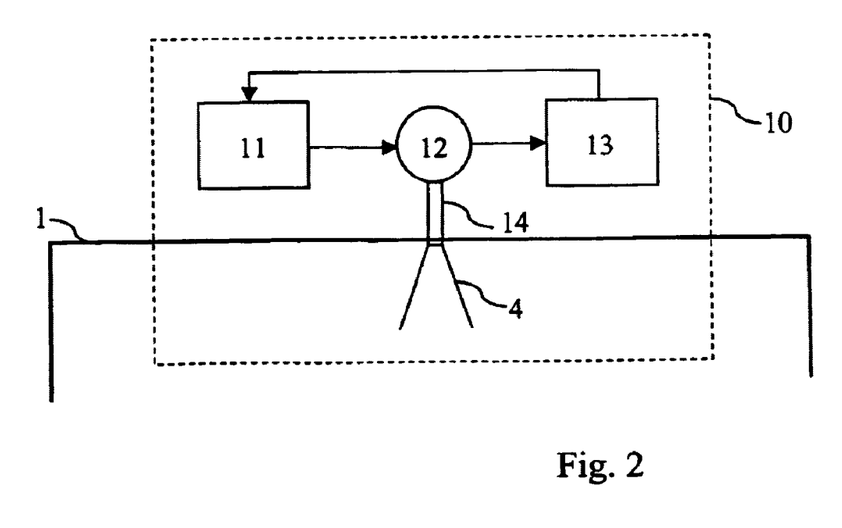
FIG. 2 shows a view of an arrangement of a radar level gauge according to the present invention.

According to the invention a level gauge operating on a mutliple of frequency bands is disclosed. An example of a radar level gauge (10) according to the invention is schematically illustrated in FIG. 2. The level gauge of FIG. 2 is composed by building blocks, which will be described below.

A control unit 11 is controlling an RF module 12. Said control unit 11 is thus controlling the switching between the different frequencies on which the RF module may operate.

The RF module 12 is generating the microwave signal for transmitting and receiving the microwaves into and from the tank as described. The signal received is transformed to a low frequency signal, which is digitalized and analyzed in a signal-analyzing unit 13. In the signal analyzer 13 the received signal is analyzed on the frequencies of which the level gauge is transmitting. From the analysis it is then decided in the signal analyzer on which frequencies the level gauge will be operated. A control signal with information about the chosen frequency is sent from the signal analyzer 13 to the control unit 11, which controls the frequency switching of the RF module 12. In the signal analyzer 13 there is also an evaluation unit, for calculation of the product surface level 6 in a conventional way. The different echo spectra received from the at least two different frequency bands are analysed in this evaluation unit for determining the level of the surface in the tank and for being the basis of the analysis of which calculated value being the most accurate as described above. Upon this analysis the evaluation unit will adopt the level gauging system to use only one of the frequency bands for determining the accurate value or to use the values from the at least two different frequency bands by use of any averaging calculation method.

The distribution of the microwave signal between the RF module 12 and the antenna 5 is accomplished by means of a transmission line 14. Said transmission line can be provided by means of a coaxial wire or by any type of a wave guide. Coaxial lines, microstrip lines, striplines or other TEM-lines inherently have wideband functionality and can be used, but depending on the type of antenna some transition unit may be required. Particularly appropriate for use as a wave guide is a ridge wave guide, as such a wave guide has the bandwidth that is necessary in this application. A conventional ridge wave guide cannot be used without structural changes as it must be sealed for use in a tank. Hence, in this embodiment the ridge wave guide is adapted to level gauging requirements by sealing the wave guide to withstand pressure and temperature differences between the inside and the outside of a tank wall. Further, the surfaces of the ridge wave guide inside the tank wall can be provided with surface layers, which can stand possible contamination and influence from chemicals. One preferred surface layer is polished PTFE, which is difficult to wet.

The RF module for generating microwaves can be operated according to any radar principle for distance measuring such as the FMCW modulation principle or according to any pulsed system. The generation of microwaves may be arranged for 2 frequency bands or for any number n of frequency bands.

As the antenna 5, any broadband antenna for microwaves may be used but many conventional wide band type antennas are not suited for use in the tough tank environment with its requirement for sealing, problems with dirt etc. The antenna must be mounted via a feed-through in the tank wall. Wide band horn antennas may be used in any of different designs, either as normal probe fed horns or, as mentioned, as so called ridge wave guides, which have extremely large bandwidth. A ridge wave-guide can further be arranged for working in both one and two polarizations. Such a horn can be connected to the RF module 12 via a connection for the ridge wave guide in the RF module. This is an advantage as a good seal for the tank can be provided inside the wave guide. An explosion tight cladding may further be provided for in the casing for the electronics. Another alternative is to connect the horn antenna to the RF module via a micro strip feeder or any type of TEM-line corresponding to a coaxial line (TEM is a common name for all cables with two or more leaders irrespective of the cross-section of the cable).

Figure 4A:
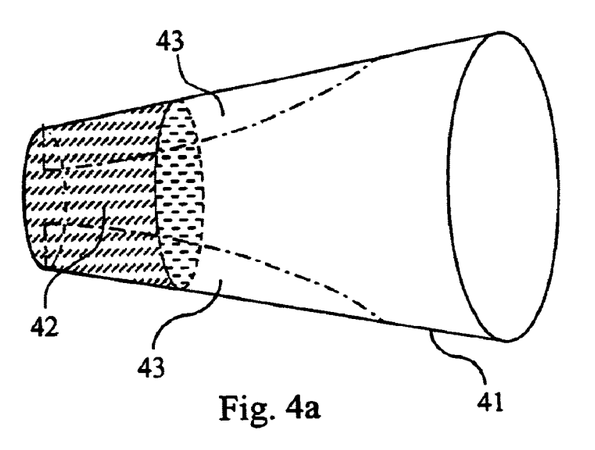
FIG. 4 shows an example of an antenna used in the invention. In this case, a ridge wave guide in some different designs are shown as examples of antennas used in the invention, where it is also shown the use of a dielectric material partly filling the horn for sealing.
Figure 4B:
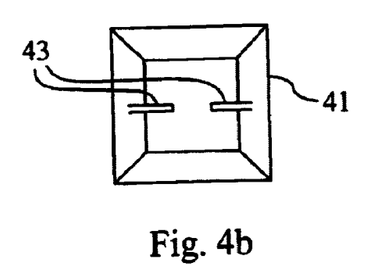
Figure 4C:
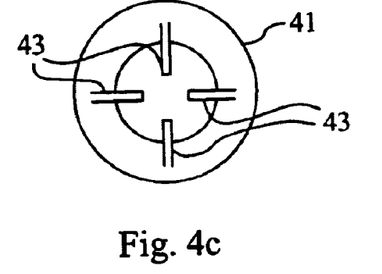
Figure 4D:
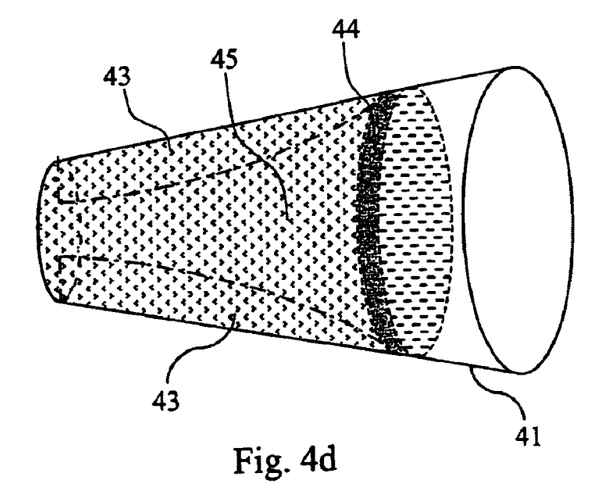

The antenna is a typical and very critical component in a multiband radar level gauging system. Beside of the normal antenna function (as described in antenna textbooks) it must fulfill all the following three requirements pressure sealing, sealing surface to withstand a layer of dirt, condensation etc and be usable over the two or more bands, typical in the present described system. As an example of a typical antenna for this purpose, a ridge horn antenna 41 which (as compared to its standard counterpart) is filled and sealed with a dielectric sealing 42 such as PTFE and shaped towards the tank atmosphere to avoid destructive condensation, i.e. as a basically conical shape which is polished. This horn can be made for linear polarization, i.e. with one or two ridges 43 (FIG. 4b) or for two linear polarizations, 4 ridges 43 as shown in FIG. 4c, in order to create circular polarization, a known technique to improve sensitivity in radar level gauges. The antenna can further be protected by means of a dielectric cover 44 across the opening of the horn (FIG. 4d). The space covered by the cover 44 is preferably, at least partly, filled with a dielectric foam plastic material 45.

Another type of antennas that can be used for the purpose are helix antennas as these antennas are frequency independent or at least inherently of wideband (multi-octave) type. Helix antennas can be provided in plane or conical designs. For these antennas, connection to the RF-module 12 is preferably made by means of a coaxial wire. If a helix antenna is used for the level guide in the present invention, in this embodiment, it will be protected and built into a dielectric to make the antenna to withstand dirt.

A log-periodic antenna or a Yagi antenna is also a possible candidate, where the log-periodic antenna typically covers several frequency bands.

Figure 6:
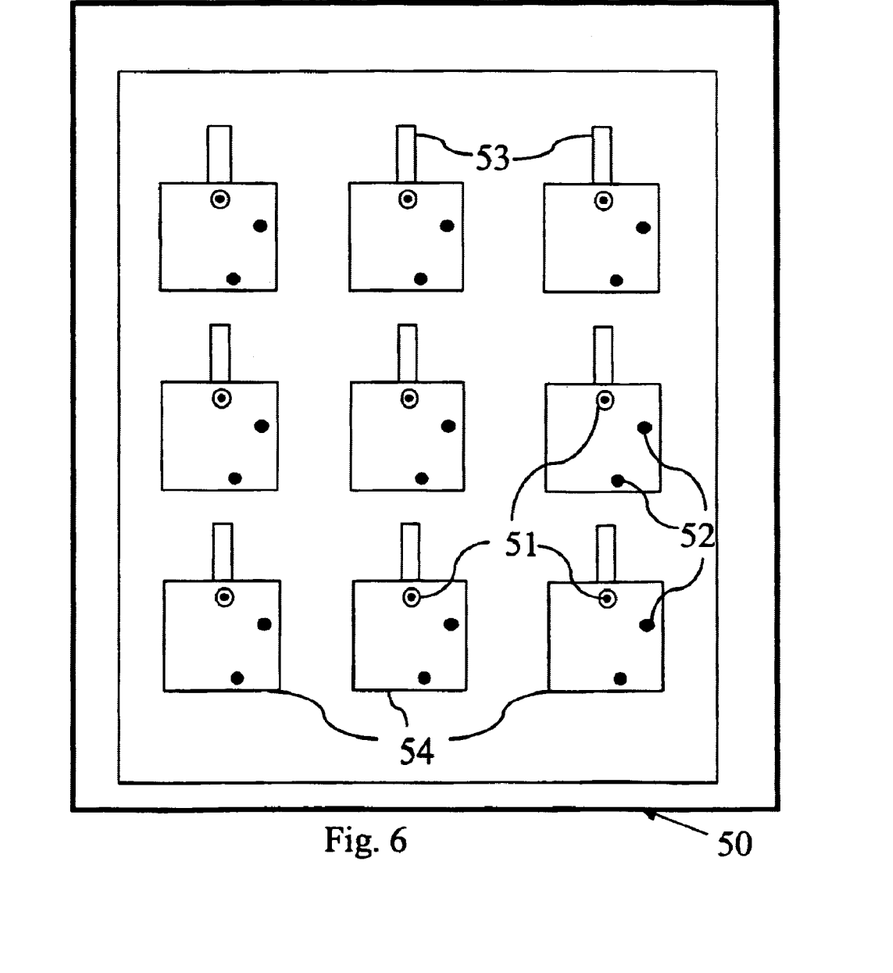
FIG. 6 shows a dual band patch antenna array

Still one more type of antennas that can be used for the purpose are patch array antennas for multiple bands. An antenna of this type can be designed in such a way that two frequency bands with two different center frequencies may be achieved, for instance by use of dual patches. An example of such an antenna is illustrated in FIG. 6, where reference number 50 denotes the antenna having a number of patch antenna elements 54 according to technique known in the art. Each patch element has a tuning stub 53 and feedpoint coaxial attachments 51. The patch elements, further, have shorting pins 52 connecting the patch elements 54 to an earth plane of the antenna. By use of a patch antenna 50 according to the shown example it is possible to arrive at a very broadband antenna for use in connection with the invention.

Different radar techniques may be used for accomplishing a multiband radar solution for use in the application as disclosed in the invention. An FMCW radar as well as a pulsed radar system could be used, as there are no differences between those systems, in principle, with regard to the present application. In the following, there is described one example of a radar using an FMCW radar system for operation on two different frequency bands according to the present invention. A block diagram showing said disclosed example is enclosed in FIG. 3 and is referred to herein by use of reference numbers. The enclosed example discloses a radar for use on the frequency bands 6 and 24 GHz. This is only shown as an illustrative example and must not be seen as any limit for use of any other method to compose the blocks of a radar system, the use of available frequency bands and the use of different radar techniques. A detailed description of the included electronic blocks will not be made here as the use of the blocks is known in the art. The blocks and there corresponding numbers are thus only mentioned by reference numbers.

Figure 3:
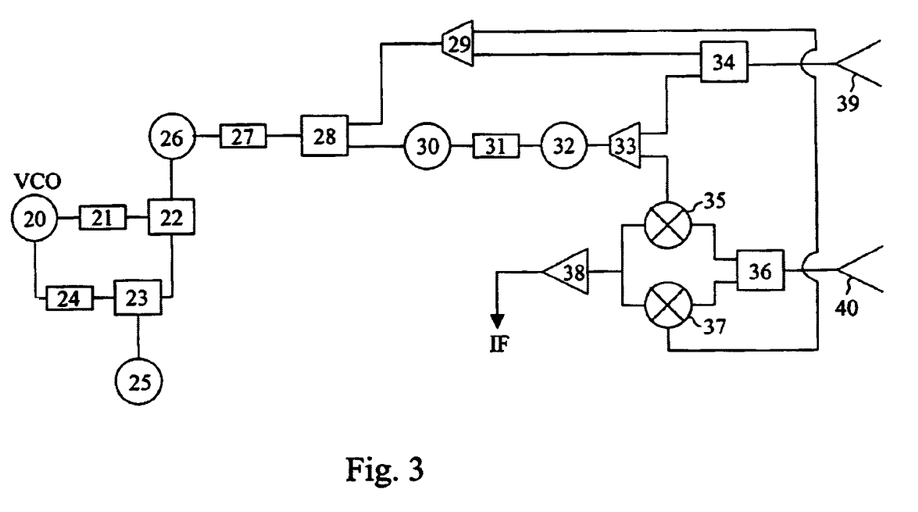
FIG. 3 is showing a schematic block diagram of one example of an FMCW radar system for operation on two different frequency bands.

20. VCO/Voltage Controlled Oscillator
21. Attenuator 1
22. Directional Coupler
23. Phase Locked Loop
24. Filter
25. Fixed Oscillator
26. Multiplier x 2
27. Attenuator 2
28. Switch 1
29. Power Divider
30. Multiplier x 2
31. Attenuator 3
32. Multiplier x 2
33. Power Divider
34. Switch 2
35. Mixer 1
36. Switch 3
37. Mixer 2
38. Amplifier
39. Transmitting Antenna
40. Receiving Antenna A pulsed radar may be realized for achieving a corresponding function by substituting the VCO and the Phase Locked Loop (PLL) 23 with an oscillator with a fixed frequency and pulse circuit.

A further possibility for a solution is to use an oscillator covering the complete, desired, frequency band and to combine this with the use of a band stop filter, which is filtering away all the portions of the bands that are not wanted or allowed for use. Still another alternative is to use a pulse generator serving two different oscillators working on the desired frequencies.

Figure 5:
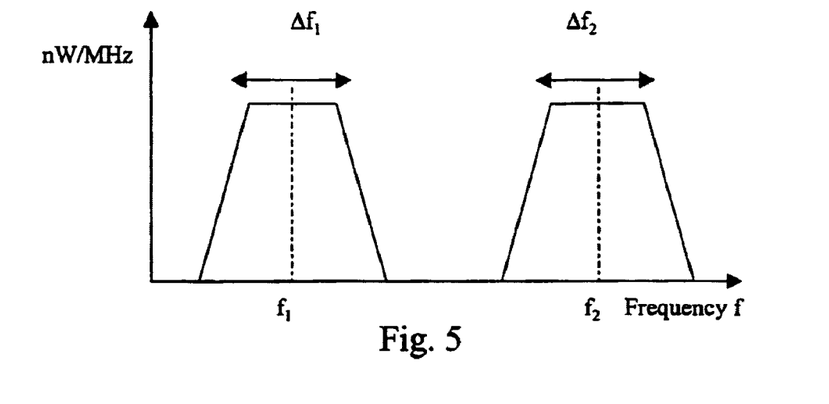
FIG. 5 shows an example of the power distribution over the frequency (power spectrum) for two microwaves operating on different frequency bands according to the invention.

In FIG. 5 the center frequency of two bands $f_1$ and $f_2$ are illustrated. Their frequencies are according to the invention related as $f_2/f_1 > 1.5$ or $f_2/f1 > 2$. The two bandwidths (3 or 10 dB down) $\Delta f_1$ and $\Delta f_2$ are not characteristic for the invention but are conventionally 0.5–2 GHz. The spectral density on the vertical axis is usually in the order of 1 nW per MHz both in case of a pulsed system and an FMCW system and that is according to current governmental regulations rather than what is required by the technology of the invention. Both for pulsed system, FMCW systems and other systems, the spectrum look alike as an average, but depending on the arrangement, the signal may appear within the two frequency bands alternatively, simultaneously or with another time distribution

The invention claimed is:

1. A level gauge for measuring the level of the surface of a product stored in a tank, said level gauge including a radar for transmitting microwaves towards said surface, for receiving microwaves reflected by said surface and for determining the level based on an evaluation of the time lapsed between the received and the transmitted waves, wherein:

said level gauge is adapted to transmit and receive said microwaves on a first frequency band consisting of frequencies having a relatively high penetration through water and forming a relatively wide radiation beam;

said level gauge is further adapted to transmit and receive said microwaves on at least one second frequency band consisting of frequencies having a relatively low penetration through water and forming a relatively narrow radiation beam; and a center frequency of the second frequency band is at least 2 times a center frequency of the first frequency band.

2. A level gauge according to claim 1, wherein said radar is coupled to a multiband antenna for transmitting and receiving said waves on said first and said second frequency band and the antenna having a seal at a feed-through in a wall of said tank, wherein said seal is made to withstand temperature and pressure differences between the interior and the exterior of the tank and to resist chemical affects by products in the tank.

3. A level gauge according to claim 2, wherein said antenna is one from the group consisting of: a horn antenna, a helix antenna, a patch array multiband antenna, a reflector antenna, a log-periodic antenna.

4. A level gauge according to claim 2, wherein the sealing of said antenna is a dielectric serving as a sealing between the interior of the tank and the surroundings.

5. A level gauge according to claim 1, wherein said radar is coupled to a broadband antenna covering the used frequencies for transmitting and receiving said waves on said first and said second frequency band and the antenna having a seal feed-through in a wall of said tank, wherein said seal is made to withstand temperature and pressure differences between the interior and the exterior of the tank and to resist chemical affects by products in the tank.

6. A level gauge according to claim 5, wherein said antenna is one from the group consisting of: a horn antenna, a helix antenna, a patch array multiband antenna, a reflector antenna.

7. A level gauge according to claim 6, wherein said gauge includes a control unit and a signal analyzing unit.

8. A level gauge according to claim 7, wherein said signal analyzing unit in dependence of a performed analysis of the received microwave signal spectrum is set to determine on which frequency band the RF module shall operate.

9. A level gauge according to claim 8, wherein said control unit by means of a control signal from said signal analyzing unit switches the RE module to operate on a predetermined microwave frequency band.

10. A level gauge according to claim 1, wherein said radar has circuits for generating microwaves in two or more microwave frequency bands and wherein said gauge includes a switching function to allow the radar to operate on any of said frequency bands by switching the radar to operate on a frequency band automatically chosen by an evaluation unit.

11. A level gauge according to claim 1, wherein said radar is a radar operating on a broad band covering the predetermined frequency bands and provided with selecting means for the choice of frequency band and wherein said gauge includes a switching function to allow the radar to be switched to operate on any of said chosen frequency bands in an automatic manner.

12. A level gauge according to claim 1, wherein the radar of the level gauge includes an RF module for generating and receiving said microwaves.

13. A level gauge according to claim 12, wherein said microwave signal is transmitted from the RE module to the antenna by means of a transmission line consisting of any one from the group of: a coaxial wire, a TEM-line, a microstrip line, a stripline, a twin line.

14. A level gauge according to claim 12, wherein said microwave signal is transmitted from the RF module to the antenna by means of a transmitting line consisting of a wideband or multiband wave guide.

15. A level gauge according to claim 14, wherein said wave guide is a ridge wave guide.

16. A level gauge according to claim 15, wherein said ridge wave guide has a circular or a rectangular or an elliptical cross section.

17. A level gauge according to claim 16, wherein said ridge wave guide is at least partly filled with a dielectric material for sealing or that it is provided with a dielectric cover across any cross section of its horn.

18. A level gauge according to claim 15, wherein said wave guide is provided with one, two or four ridges in order to transmit microwave signals in one or two or circular polarization.

19. A level gauge according to claim 1, wherein the first frequency band consists of frequencies within a range of 10 GHz +/−5% or below, and the second frequency band consists of frequencies within a range of 25 GHz +/−5% or above.

20. A level gauge according to claim 1, wherein the first frequency band consists of frequencies below 12.4 GHz, and the second frequency band consists of frequencies above 22 GHz.

21. A level gauge according to claim 1, wherein the center frequency of the first frequency band is about 10 GHz or below, and wherein the center frequency of the second frequency band is about 25 GHz or above.

22. A level gauge according to claim 21, wherein the bandwidth of the first and second frequency bands are within the range 0.5–2 GHz.

23. A level gauge according to claim 21, wherein the center frequency of the first frequency band is about 6 GHz or below.

24. A method for measuring the level of the surface of a product stored in a tank comprising the steps of:
transmitting a microwave signal towards said surface by means of a radar,
receiving a microwave signal reflected by said surface by means of said radar,
transmitting and receiving said microwave signals on a first frequency band consisting of frequencies having a relatively high penetration through water and forming a relatively wide radiation beam,
transmitting and receiving said microwave signals on at least a second frequency band consisting of frequencies having a relatively low penetration through water and forming a relatively narrow radiation beam,
setting the center frequency of the second frequency band to more than 2 times the center frequency of the first frequency band, and
evaluating the level based on the time lapsed between the corresponding transmitted and received microwave signals.

25. The method according to claim 24, comprising:
analyzing in a signal analyzer a first echo spectrum generated and based on the signal transmitted and received on the first frequency band,
analyzing at least a second echo spectrum generated and based on the signal transmitted and received on the at least second frequency band, and
in dependence of the analysis performed on the microwave spectra automatically setting the radar to work on only one of said frequency bands for determining the level based on the level calculation performed for the frequency band to which the radar is set.

26. The method according to claim 24, comprising:
analyzing in a signal analyzer a first echo spectrum generated and based on the signal transmitted and received on the first frequency band, analyzing at least a second echo spectrum generated and based on the signal transmitted and received on the at least second frequency band, and in dependence of the analysis performed on the microwave spectra automatically setting the radar to work on all of said frequency bands for determining the level based on an average of the calculation of the level performed for each of said frequency bands.

27. The method according to claim 24, wherein the first frequency band consists of frequencies within a range of 10 GHz +/−5% or below, and the second frequency band consists of frequencies within a range of 25 GHz +/−5% or above.

28. The method according to claim 24, wherein the first frequency band consists of frequencies below 12.4 GHz, and the second frequency band consists of frequencies above 22 GHz.

29. The method according to claim 24, wherein the center frequency of the first frequency band is about 10 GHz or below, and wherein the center frequency of the second frequency band is about 25 GHz or above.

30. The method according to claim 29, wherein the bandwidth of the first and second frequency bands are within the range 0.5–2 GHz.

31. The method according to claim 29, wherein the center frequency of the first frequency band is about 6 GHz or below.

32. A level gauge for measuring the level of the surface of a product stored in a tank, said level gauge including a radar for transmitting microwaves towards said surface, for receiving microwaves reflected by said surface and for determining the level based on an evaluation of the time lapsed between the received and the transmitted waves, wherein said level gauge is adapted to transmit and receive said microwaves on a first frequency band, which consists of frequencies below 12.4 GHz; and said level gauge is further adapted to transmit and receive said microwaves on at least one second frequency band, which consists of frequencies above 22 GHz.

33. A level gauge for measuring the level of the surface of a product stored in a tank, said level gauge including a radar for transmitting microwaves towards said surface, for receiving microwaves reflected by said surface and for determining the level based on an evaluation of the time lapsed between the received and the transmitted waves, wherein said level gauge is adapted to transmit and receive said microwaves on a first frequency band, wherein a center frequency of said first frequency band is about 10 GHz or below; and said level gauge is further adapted to transmit and receive said microwaves on at least one second frequency band, wherein a center frequency of said second frequency band is about 25 GHz or above.

34. The level gauge according to claim 33, wherein the bandwidth of the first and second frequency bands are within the range 0.5–2 GHz.

35. The level gauge according to claim 33, wherein the center frequency of the first frequency band is about 6 GHz or below.

36. A method for measuring the level of the surface of a product stored in a tank comprising the steps of:

transmitting a microwave signal towards said surface by means of a radar, receiving a microwave signal reflected by said surface by means of said radar, transmitting and receiving said microwave signals on a first frequency band, wherein a center frequency of said first frequency band is about 10 GHz or below, transmitting and receiving said microwave signals on at least one second frequency band, wherein a center frequency of said second frequency band is about 25 GHz or above, and evaluating the level based on the time lapsed between the corresponding transmitted and received microwave signals.

37. The method according to claim 36, wherein the bandwidth of the first and second frequency bands are within the range 0.5–2 GHz.

38. The method according to claim 36, wherein the center frequency of the first frequency band is about 6 GHz or below.

* * * * *